United States Patent
Mishra et al.

(10) Patent No.: US 11,372,572 B2
(45) Date of Patent: Jun. 28, 2022

(54) SELF-RELOCATING DATA CENTER BASED ON PREDICTED EVENTS

(71) Applicant: KYNDRYL, INC., New York, NY (US)

(72) Inventors: KamalaKanta Mishra, Bangalore (IN); Soumo Chakraborty, Bangalore (IN); Binoy Gopalakrishnapillai, Bangalore (IN)

(73) Assignee: KYNDRYL, INC., New York, NY (US)

( * ) Notice: Subject to any disclaimer, the term of this patent is extended or adjusted under 35 U.S.C. 154(b) by 257 days.

(21) Appl. No.: 16/869,952

(22) Filed: May 8, 2020

(65) Prior Publication Data
US 2021/0349650 A1    Nov. 11, 2021

(51) Int. Cl.
G06F 3/06 (2006.01)
G06F 9/54 (2006.01)
G06F 9/50 (2006.01)
G06N 3/08 (2006.01)
G06F 9/38 (2018.01)

(52) U.S. Cl.
CPC ............ *G06F 3/0647* (2013.01); *G06F 3/067* (2013.01); *G06F 9/3838* (2013.01); *G06F 9/5005* (2013.01); *G06F 9/542* (2013.01); *G06N 3/08* (2013.01)

(58) Field of Classification Search
None
See application file for complete search history.

(56) References Cited

U.S. PATENT DOCUMENTS

| 6,381,694 B1 | 4/2002 | Yen |
| 8,024,611 B1 | 9/2011 | Meek et al. |
| 9,170,849 B2 | 10/2015 | Calder et al. |
| 9,678,823 B2 | 6/2017 | Kumeta et al. |

(Continued)

OTHER PUBLICATIONS

Wang et al., "Earthquake Prediction based on Spatio-Temporal Data Mining: An LSTM Network Approach", https://ieeexplore.ieee.org/document/7913634, IEEE Transactions on Emerging Topics in Computing, Apr. 27, 2017, 2 pages.

(Continued)

*Primary Examiner* — Brian R Peugh
(74) *Attorney, Agent, or Firm* — Erik Swanson; Andrew M. Calderon; Roberts Calderon Safran & Cole P.C.

(57) ABSTRACT

A self-relocating data center and method is provided. In implementations, a method includes: receiving input data from a data center over a period of time, the input data including sensor data; determining parameter data sets based on the input data, the parameter data sets reflecting operating states of resources of the data center over the period of time; determining dependencies between the parameter data sets using a stacked long short term memory (LSTM) process; generating a model based on the dependencies between the respective parameter data sets and stored target data parameters; determining an event based on an output of the model and the stored target parameter data, wherein an input to the model is real-time input data received from the data center; and initiating a self-relocating event to automatically relocate data of the data center to a secondary data center without human intervention based on the event.

20 Claims, 8 Drawing Sheets

(56) References Cited

U.S. PATENT DOCUMENTS

| | | | |
|---|---|---|---|
| 9,791,837 B2 | 10/2017 | Slessman et al. | |
| 2010/0299492 A1* | 11/2010 | Shu .................... | G06F 11/0775 709/206 |
| 2012/0297241 A1* | 11/2012 | Jeddeloh ............... | G06F 11/073 714/48 |
| 2017/0220605 A1* | 8/2017 | Nivala .................. | G06F 16/282 |
| 2021/0303411 A1* | 9/2021 | Kvache ................ | H04L 9/3213 |

OTHER PUBLICATIONS

Tziortzios et al., "Distributed Disaster Detection in a cloud environment", https://www.os3.nl/_media/2011-2012/courses/lia/mohammad_-_reportbase.pdf, ResearchGate, Apr. 2012, 15 pages.
Brownlee, "Stacked Long Short-Term Memory Networks", https://machinelearningmastery.com/stacked-long-short-term-memory-networks.com, Machine Learning Mastery, Aug. 18, 2017, 30 pages.
Mell et al., "The NIST Definition of Cloud Computing", NIST, Special Publication 800-145, Sep. 2011, 7 pages.

* cited by examiner

SELF-RELOCATING DATA CENTER BASED ON PREDICTED EVENTS

BACKGROUND

Aspects of the present invention relate generally to data centers and, more particularly, to self-relocating data centers utilizing stacked long short term memory (LSTM) prediction models.

Data centers are typically a large group of networked computer servers used by organizations for remote storage, processing, or distribution of large amounts of data. Data centers typically comprise facilities for housing and maintaining resources (e.g., servers, chillers, etc.). Monitoring, optimizing and controlling a data center or data center infrastructure assets is typically performed manually. Organizations may construct data center disaster recovery plans to mitigate business disruption and provide maximum fault tolerance for all computer-related business functions in the case of problems at a data center facility.

An LSTM is an artificial recurrent neural network (RNN) architecture used in the field of deep learning. An LSTM can process single data points or sequences of data. In general, a stacked LSTM is a long short-term memory method comprised of multiple layers, wherein one layer above another is stacked up in a sequence. One LSTM layer provides a sequence output to another LSTM layer adjacent to it, and so on. Typically, an LSTM layer provides one output per input time step instead of one consolidated output time step for all input time steps.

SUMMARY

In a first aspect of the invention, there is a computer-implemented method including: receiving, by a computing device, input data from a primary data center over a period of time, the input data including sensor data from sensors of the primary data center; determining, by the computing device, historic parameter data sets based on the input data, the historic parameter data sets reflecting operating states of one or more resources of the primary data center over the period of time; determining, by the computing device, dependencies between the historic parameter data sets using a stacked long short term memory (LSTM) process; generating, by the computing device, a triggering event prediction model based on the dependencies between the respective historic parameter data sets and stored target data parameters; determining, by the computing device, a triggering event based on an output of the triggering event prediction model and the stored target parameter data, wherein an input to the triggering event prediction model is real-time input data received from the primary data center; and initiating, by the computing device, a self-relocating event to automatically relocate data of the primary data center to a secondary data center without human intervention based on the determined triggering event.

In another aspect of the invention, there is a computer program product including one or more computer readable storage media having program instructions collectively stored on the one or more computer readable storage media. The program instructions are executable to: store target parameter data including threshold limits for parameters associated with one or more resources of a primary data center; receive input data from the primary data center over a period of time, the input data including sensor data from sensors of the primary data center; determine historic parameter data sets based on the input data, the historic parameter data sets reflecting operating states of the one or more resources of the primary data center over the period of time; determine dependencies between the historic parameter data sets using a stacked long short term memory (LSTM) process; generate a triggering event prediction model based on the dependencies between the respective historic parameter data sets and the stored target data parameters; determine a triggering event based on an output of the triggering event prediction model and the stored target parameter data, wherein an input to the triggering event prediction model is real-time input data received from the primary data center; and initiate a self-relocating event to automatically relocate data of the primary data center to a secondary data center without human intervention based on the determined triggering event.

In another aspect of the invention, there is system including a processor, a computer readable memory, one or more computer readable storage media, and program instructions collectively stored on the one or more computer readable storage media. The program instructions are executable to: receive input data from a primary data center over a period of time, the input data including sensor data from sensors of the primary data center; determine historic parameter data sets based on the input data, the historic parameter data sets reflecting operating states of the one or more resources of the primary data center over the period of time; determine dependencies between the historic parameter data sets using a stacked long short term memory (LSTM) process; generate a triggering event prediction model based on the dependencies between the respective historic parameter data sets and stored target data parameters; receive real-time input data from the primary data center; determine a triggering event based on an output of the triggering event prediction model and the stored target parameter data, wherein an input to the triggering event prediction model is the real-time input data; and initiate a self-relocating event to automatically relocate data of the primary data center to a secondary data center without human intervention based on the determined triggering event.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Aspects of the present invention relate generally data centers and, more particularly, to self-relocating data centers utilizing stacked long short term memory (LSTM) prediction models. In embodiments, a self-relocating data center system and method is provided for utilizing a stacked LSTM process to gather input information from Internet of Things (IoT) connected devices and instrumented infrastructure of a primary data center, predict triggering events (e.g., failures or calamities) at the primary data center, and automatically relocate the primary data center to a nearest and safe alternate (secondary) data center without human intervention and logical switch-over. In implementations, the term relocate refers to migration of data between the primary data center and an alternate data center, and other functions related thereto to switch from the primary data center to the alternate data center. Embodiments of the invention model dependencies between data center parameters and forecast/predict undesirable scenarios (triggering events) in a precise manner.

During an unforeseen circumstance like natural disaster or natural calamity, a data center may need to shut down its operations, and operations may need to be switched over to a disaster recovery (DR) data center as an alternate solution. Embodiments of the invention address technical challenges associated with predicting triggering events (failure events, etc.) at data centers, and provide methods for automatically relocating a data center based on predicted triggering events.

In embodiments, a method is provided that models long term sequential dependencies between data center parameters and forecasts/predicts scenarios in a precise/accurate manner. In implementations, a server automates enablement of self-relocation of data centers using cognitive methods to switch over a data center from Point A to Point B based on proactive failure understanding based on a cognitive engine outcome. In aspects of the invention, a feature engineering process (analyzing sets of data center parameters related to a particular feature) leverages sequential dependencies between input parameters that are referred in a stack wise manner to compute predictions of failure events at a future time at a data center.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
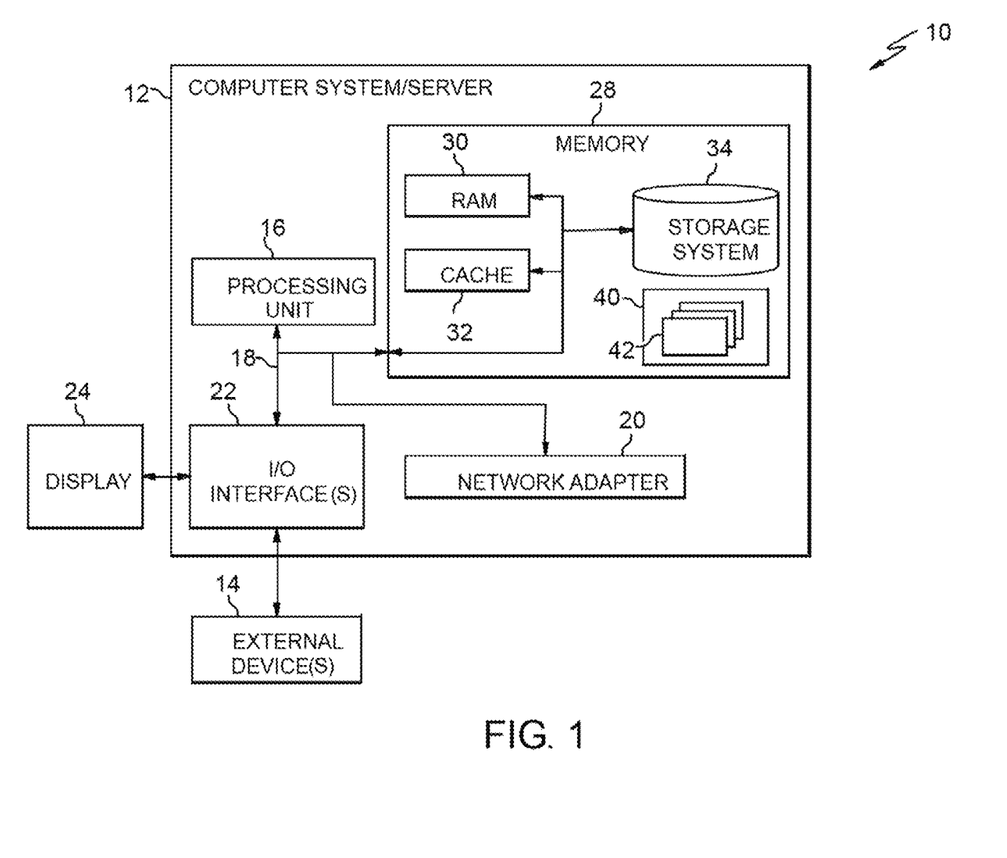
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
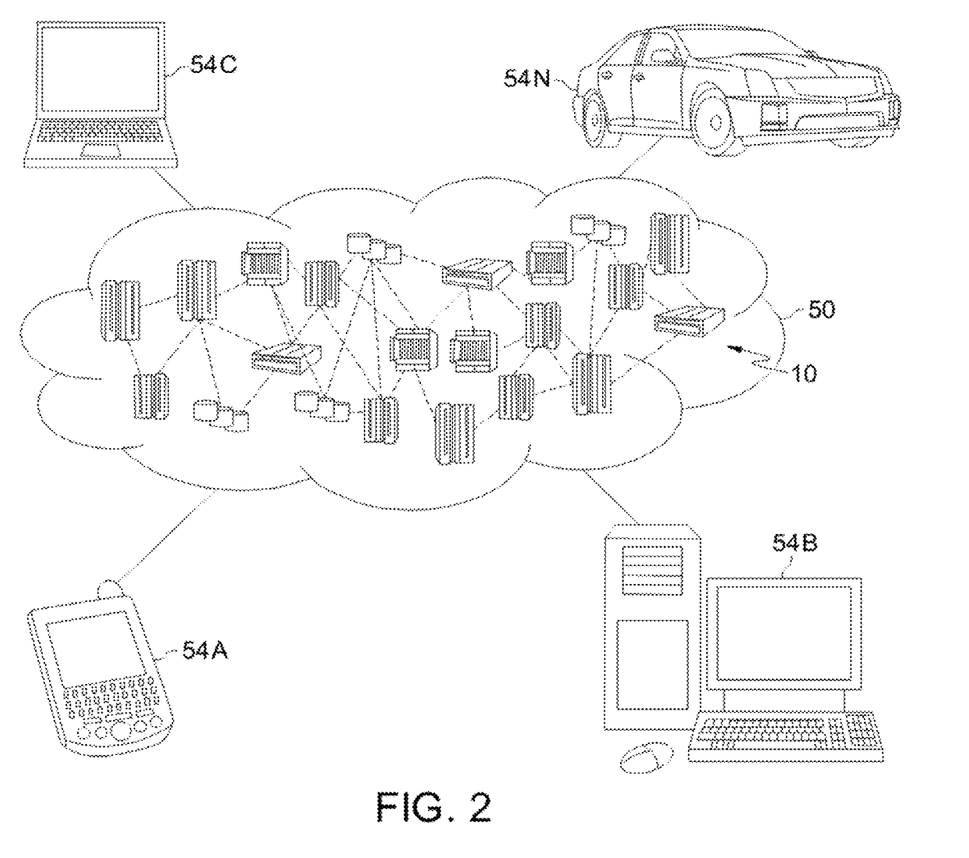
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
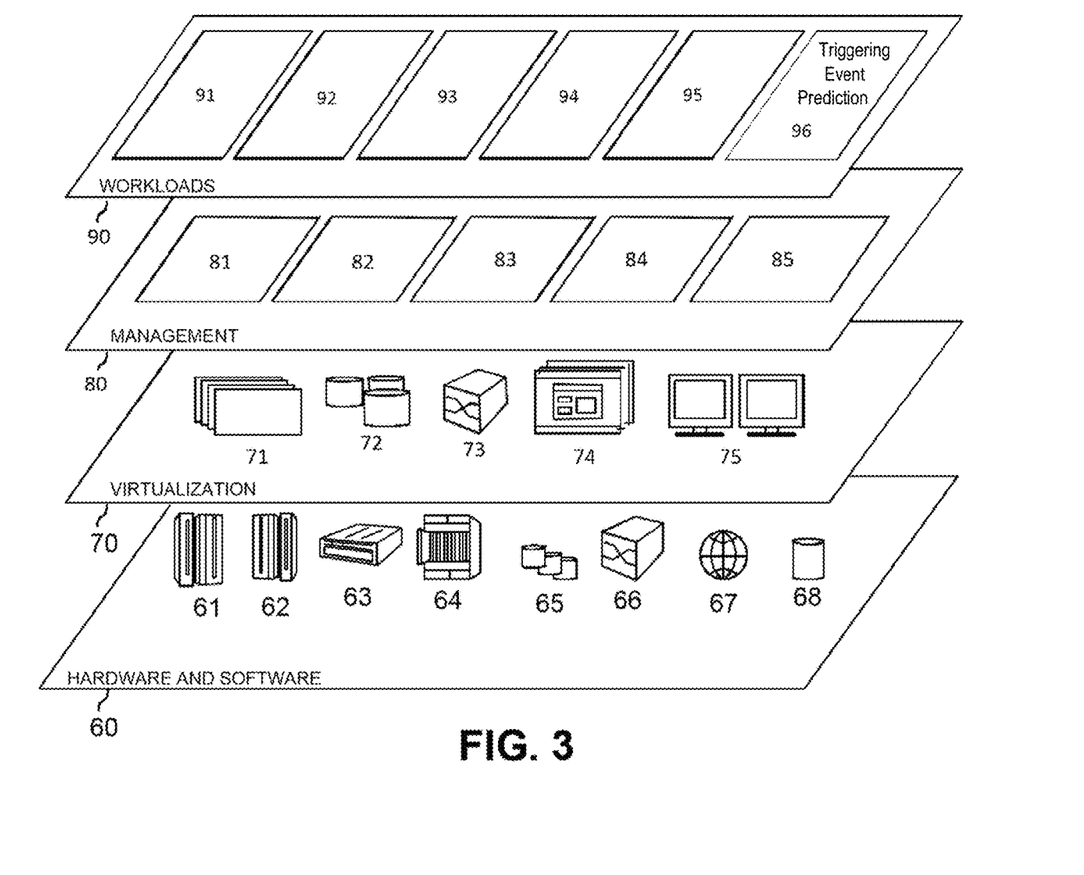
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and triggering event prediction 96.

Implementations of the invention may include a computer system/server 12 of FIG. 1 in which one or more of the program modules 42 are configured to perform (or cause the computer system/server 12 to perform) one or more functions of the triggering event prediction 96 of FIG. 3. For example, the one or more of the program modules 42 may be configured to: receive input data from a primary data center over a period of time; derive historic parameter data from the input data, determine long-term sequential dependencies between the historic parameter data, generate a triggering event prediction model based on the long-term sequential dependencies, and initiate a self-relocating data event to automatically transfer data from the primary data center to an alternative data center without human intervention.

Figure 4:
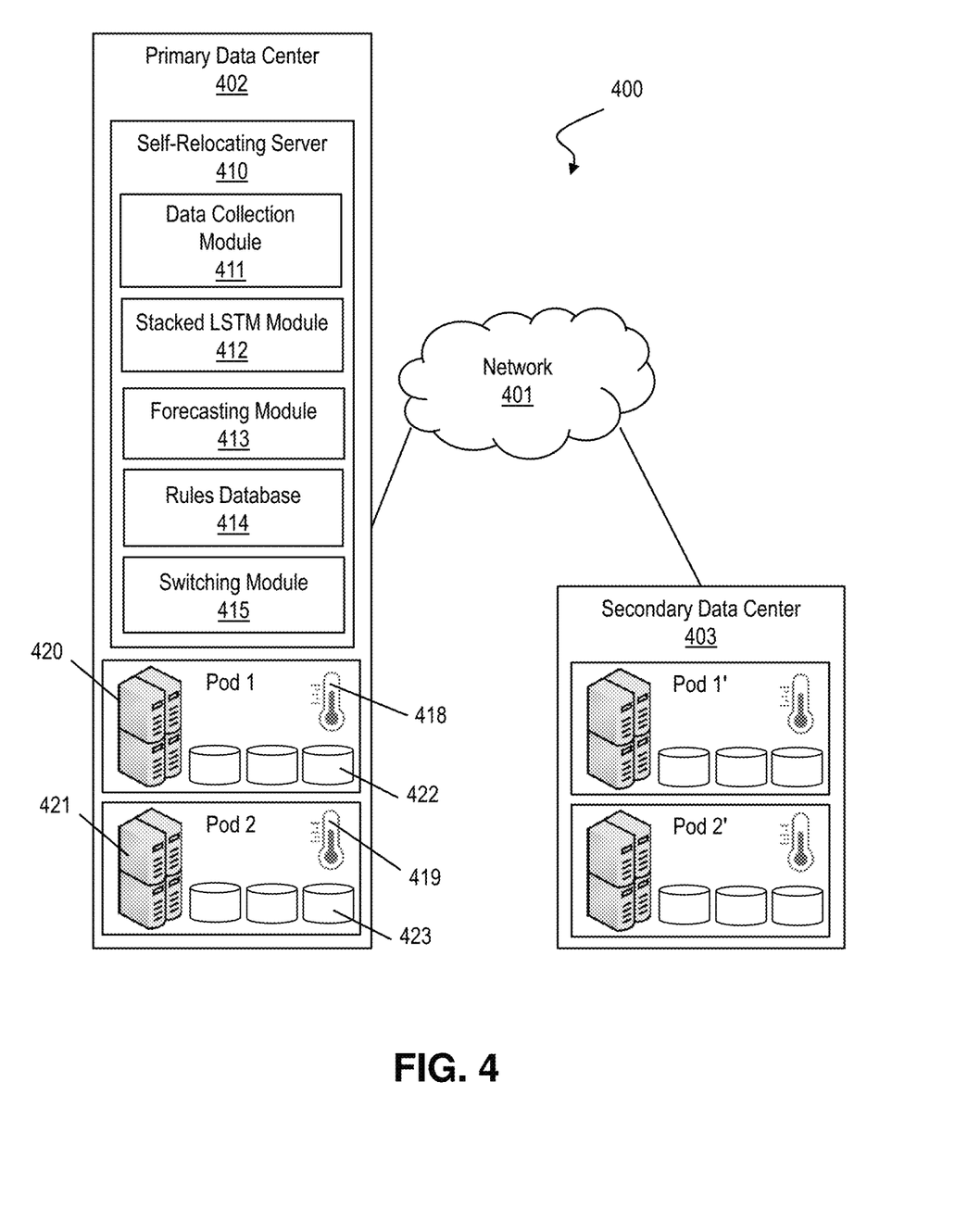
FIG. 4 shows a block diagram of an exemplary environment in accordance with aspects of the invention.

FIG. 4 shows a block diagram of an exemplary environment in accordance with aspects of the invention. In embodiments, the environment 400 includes a network 401 interconnecting one or more components of a primary data center 402 with one or more components of a secondary data center 403. In implementations, the primary data center 402 includes a self-relocating server 410 (hereafter server 410) and other data center resources. In the example of FIG. 4, at least some of the data center resources are organized in pod clusters represented by Pod 1 and Pod 2.

In embodiments, the devices of the environment 400 comprise one or more program modules, such as program modules 42 described with respect to FIG. 1. In implementations, the server 410 includes one or more of the following program modules (e.g., program modules 42 of FIG. 1): a data collection module 411, a stacked LSTM module 412, a forecasting module 413, a rules database 414 and a switching module 415.

In implementations, the data collection module 411 of the server 410 is configured to collect input data from one or more sensors (e.g., 418, 419) or other data input sources of the primary data center 402. In implementations, the data collection module 411 collects sensor data from one or more sensors, which may be internet-of-things (IoT) sensors. The term IoT sensor as used herein refers to a sensor for a device provided with a unique identifier, which has the ability to transfer data over a network without requiring human interaction. In embodiments, the data collection module 411 is further configured to derive historic parameter data sets from the input data for input into the stacked LSTM module 412 of the server 410.

In embodiments, the stacked LSTM module 412 is configured to utilize the historic parameter data sets from the data collection module 411 to determine dependencies (e.g., long-term sequential dependencies) between the historic parameter data sets using stacked LSTM processing. In implementations, the stacked LSTM module 412 generates a triggering event prediction model based on the determined dependencies, wherein the triggering event prediction model is configured to predict failure events or the like at the primary data center 402 that trigger automatic relocation of the primary data center 402 to the secondary data center 403.

In implementations, the forecasting module 413 is configured to input real-time parameter data sets derived from real-time input data (e.g., real-time sensor data) of the primary data center 402 into the triggering event prediction model derived by the stacked LSTM module 412 to produce an output. In aspects of the invention the forecasting module 413 is configured to determine if a triggering event is predicted to occur based on the output from the triggering event prediction model and predetermined target parameter data (e.g., threshold values) stored in the rules database 414.

In embodiments of the invention, the switching module 415 of the server 410 is configured to automatically initiate a relocation event to relocate data from the primary data center 402 to the secondary data center 403 based on a triggering event determined by the server 410 using the triggering event prediction model. In implementations, the switching module 415 cause the primary data center to effectively relocate to the secondary data center without human intervention. The switching module 415 may communicate with one or more switches, wherein the switches are configured to connect devices on a computer network to receive and forward data to a destination device(s).

It should be understood that the primary data center 402 may include any number and type of data center resources, including one or more servers (e.g., 420, 421), data storage (e.g., 422, 423) and sensors (e.g., 418, 419). In the example of FIG. 4, resources of the primary data center 402 are organized in pod clusters as represented by Pod 1 and Pod 2, with each pod including four (4) servers (e.g., 420, 421). In the example of FIG. 4, the secondary data center 403 is depicted configured for the migration of data from the primary data center 402, and includes a Pod 1' and Pod 2' to which data can be migrated from Pod 1 and Pod 2 of the primary data center 402.

The network 401 may be any suitable communication network or combination of networks, such as a local area network (LAN), a general wide area network (WAN), and/or a public network (e.g., the Internet). In embodiments, the primary data center 402 and the secondary data center 403 comprise nodes 10 within the cloud computing environment 50 of FIG. 2.

The server 410 may include additional or fewer modules than those shown in FIG. 4. In embodiments, separate modules (e.g., modules 411-415) may be integrated into a single module. Additionally, or alternatively, a single module may be implemented as multiple modules. Moreover, the quantity of devices and/or networks in the environment 400 is not limited to what is shown in FIG. 4. In practice, the environment 400 may include additional devices and/or networks; fewer devices and/or networks; different devices and/or networks; or differently arranged devices and/or networks than illustrated in FIG. 4.

Figure 5:
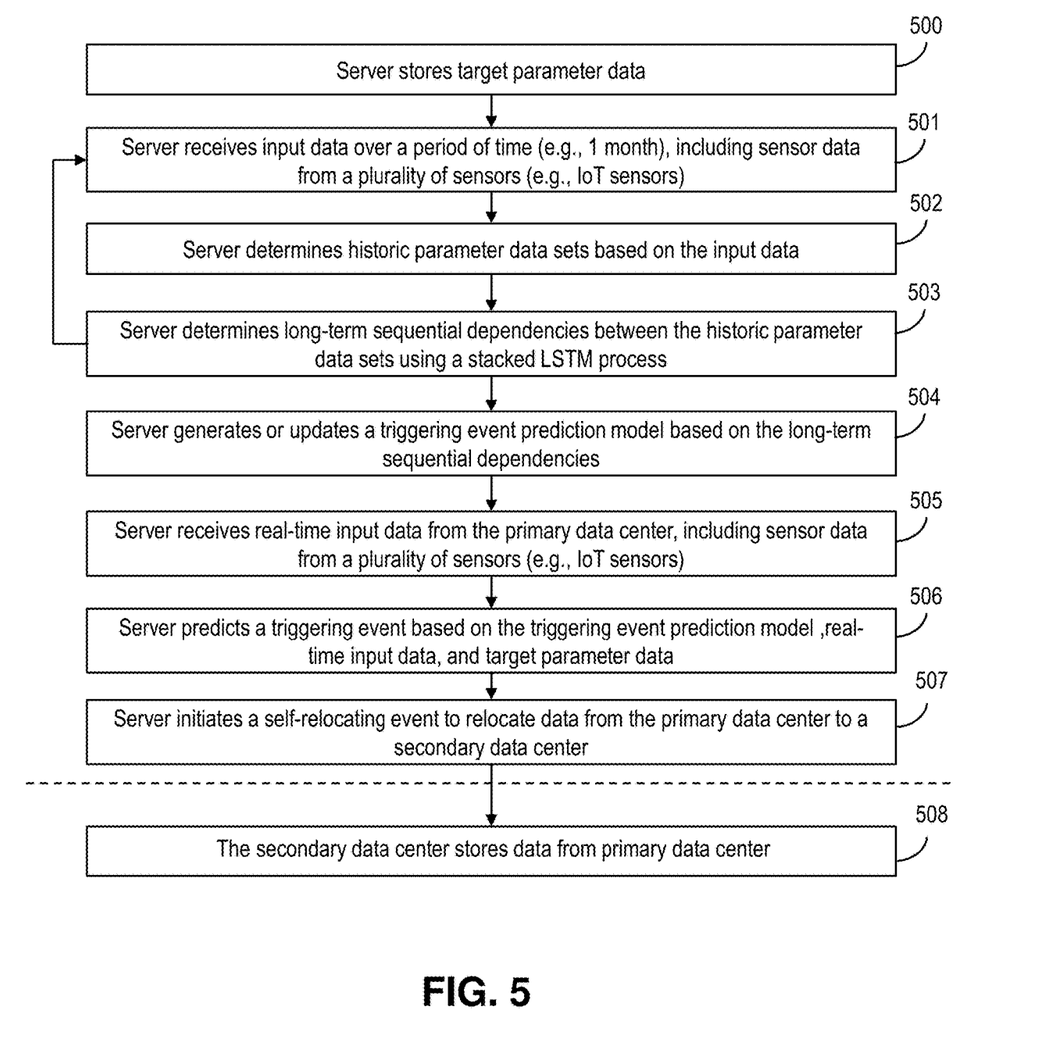
FIG. 5 shows a flowchart of an exemplary method in accordance with aspects of the invention.

FIG. 5 shows a flowchart of an exemplary method in accordance with aspects of the present invention. Steps of the method may be carried out in the environment of FIG. 4 and are described with reference to elements depicted in FIG. 4.

At step 500, the server 410 stores target parameter data (e.g., cutoff values or thresholds) for the primary data center 402 in the rules database 414. In implementations, the target parameter data indicates desirable parameters or parameter ranges for the primary data center for multiple features. For example, the target parameter data may reflect a desirable temperature range (target temperature range) or humidity range (target humidity range) for the proper functioning of a server environment. The target parameter data may represent thresholds for states of the primary data center. For example, in embodiments, if a temperature in a server environment is outside of the target temperature range than the temperature does not meet the temperature threshold. The target parameter data may be determined by a user, or may be learned by the server 410 over time based on user input. In embodiments, the data collection module 411 of the server 410 implements step 500.

At step 501, the server 410 receives input data from one or more resources of the primary data center 402 over a period of time. In one example, input data is received for a one (1) month time period. In embodiments, the input data includes a time period specific parameter. In implementations, the input data includes sensor data from a plurality of sensors (e.g., 418, 419) of the primary data center. In aspects of the invention, the sensors are associated with one or more resources or groups of resources (e.g., servers, chillers, environmental sensors, etc.) of the primary data center. Sensor data may include, for example, internet-of-things (IoT) sensor data, data regarding the functioning of one or more chillers (e.g., chiller demographics), data regarding the functioning of servers (e.g., server demographics), data regarding the functioning of other equipment within the primary data center, humidity data, and temperature data. In implementations, the input data reflects states of resources of the primary data center 402, states of portions of the primary data center 402, or states of the primary data center 402 as a whole. In implementations, the input data includes time data associated with a time the data was collected or generated and/or identifying data including information regarding a source of the data (e.g., sensor data associated with a particular pod cluster of the primary data center 402).

In aspects of the invention, the input data includes previously derived data reflecting states of one or more resources, groups of resources of the primary data center 402, or the primary data center as a whole 402. In embodiments, the data collection module 411 of the server 410 implements step 501.

At step 502, the server 410 determines historic parameter data sets based on the input data. In implementations, the historic parameter data sets reflect operating states of one or more resources of the primary data center 402 over the period of time. In implementations, the historic parameter data sets are derived based on the time data associated with the input data. In aspects, the historic parameter data sets have values indicating various indexes (criticality index, reliability index, etc.) for each server or group of servers (e.g., 420, 421) within the primary data center 402. In implementations, the server 410 processes or transforms the input data received at step 501 to be in a correct format for input into an input layer of a stacked LSTM process of the present invention. Historic data parameter sets may include, for example: an identification of the primary data center 402; server demographics, chiller demographics, a reliability index, an availability index, a criticality index, a capacity index, an efficiency index, a density index, growth plan parameters (if any), temperature parameters, humidity parameters or other sensor parameters. In embodiments, the data collection module 411 of the server 410 implements step 502.

At step 503, the server 410 determines long-term sequential dependencies between the historic parameter data sets using a stacked LSTM process. In general, a LSTM is an artificial recurrent neural network (RNN) architecture used in the field of deep learning. An LSTM can process single data points or sequences of data. In general, a stacked long short-term memory (LSTM) is a long short-term memory method comprised of multiple layers (regions), wherein one layer above another is stacked up in a sequence. One layer provides a sequence output to another LSTM layer adjacent to it, and so on. Typically, an LSTM layer provides one output per input time step instead of one consolidated output time step for all input time steps. In implementations, the server 410 uses a region or layer-based stacked LSTM to determine multi-sequence dependencies between the historic parameter data sets. The determined multi-sequence dependencies are used to generate a triggering event prediction model to constantly look for one or more feature parameter sets from the primary data center 402. In implementations, the server 410 analyses the historic parameter data sets to determine correlations between each one of the historic parameter data sets, and between each of the historic parameter data sets and the stored target parameters, and determines dependencies based thereon. In implementations, each historic parameter data set is taken as an input to the stacked LSTM, including time specific parameter data sets. In implementations time step regions or layers of the stacked LSTM are determined based on the time-period parameters. In embodiments, the stacked LSTM module 412 of the server 410 implements step 503.

At step 504, the server 410 generates or updates a triggering event prediction model based on the long-term sequential dependencies of step 503, wherein the triggering event prediction model predicts triggering events (e.g., events that trigger relocation of the primary data center 402 to the secondary data center 403) such as forecasted failures of equipment/resources of the primary data center 402. It should be understood that steps 501-503 may be repeated for N number of time periods, wherein the triggering event prediction model is generated or updated based on the iterative steps to improve the triggering event prediction model over time. In one example, historic parameter data sets for multiple months are utilized to generate the triggering event prediction model of the present invention. In embodiments, the stacked LSTM module 412 of the server 410 implements step 504.

At step 505, the server 410 receives real-time input data from one or more resources of the primary data center 402, in real-time, including sensor data from a plurality of sensors (e.g., sensors 418, 419) of the primary data center 402. In aspects, the real-time input data is obtained from at least some of the same resources as the input data received at step 501. Sensor data may include, for example, internet-of-things (IoT) sensor data, data regarding the functioning of one or more chillers (e.g., chiller demographics), data regarding the functioning of servers (e.g., server demographics), data regarding the functioning of other equipment within the primary data center, humidity data, and temperature data. In implementations, the real-time input data reflects current states of resources of the primary data center 402, current states of portions of the primary data center 402, or current states of the primary data center 402 as a whole. In implementations, the real-time input data includes time data associated with a time the data was collected or generated and/or identifying data including information regarding a source of the real-time input data (e.g., sensor data associated with a particular pod cluster of the primary data center 402). In implementations, the real-time input data is processed or configured to be in a proper form for input into an input layer of the triggering event prediction model of step 504. Step 505 may be performed on a continuous basis. In embodiments, the data collection module 411 of the server 410 implements step 505.

At step 506, the server 410 determines a triggering event based on an output of the triggering event prediction model and the stored target parameter data, wherein the real-time input data is an input to the triggering event prediction model to produce the output. In implementations, the triggering event indicates that an undesirable event (e.g., failure) is likely to occur at the primary data center 402. In implementations, the server 410 determines the triggering event based on a likelihood of probability and based on the stored target parameter data (cutoff values). In one example, a predetermined cutoff value for a particular parameter set is 0.85. In this example, an output of the triggering event model for the particular parameter set having a probability above 85% is a triggering event that causes the server 401 to initiate a self-relocation process based on the cutoff value. In embodiments, the forecasting module 413 of the server 410 implements step 506.

At step 507, the server 410 initiates a self-relocating event to automatically relocate data from the primary data center 402 to the secondary data center 403, without human intervention, based on determining the triggering event at step 506. In implementations, upon determining that a triggering event has occurred, the server 410 sends a notification to a main switch unit (e.g., switching module 415) of the primary data cementer 402 to cause the main switch unit to initiate a self-relocation event or process for switch-over from the primary data center 402 to the secondary data center 403. In embodiments, the forecasting module 413 of the server 410 implements step 506. In embodiments, the forecasting module 413 of the server 410 implements step 507 in conjunction with the switching module 415.

At step 508, upon initiation of the self-relocating event at step 507, the secondary data center 403 stores data from the primary data center 402. For example, data from Pod 1 and Pod 2 of the primary data center 402 can be stored at Pod 1' and Pod 2' of the secondary data center 403. In implementations, the secondary data center 403 is a self-relocating data center configured to perform the steps of FIG. 5.

Figure 6:
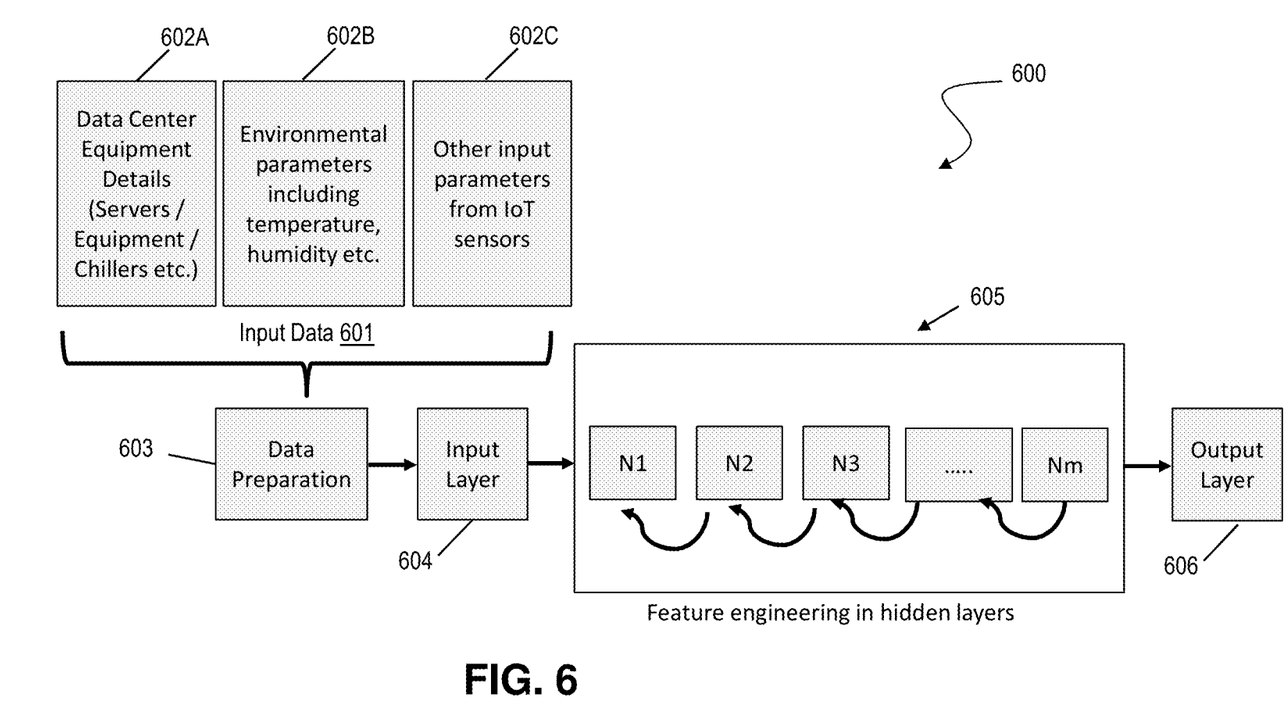
FIG. 6 depicts an exemplary stacked LSTM process in accordance with embodiments of the invention.

FIG. 6 depicts an exemplary stacked LSTM process 600 in accordance with embodiments of the invention. As depicted in FIG. 6, the server 410 of FIG. 4 collects the real-time input data 601 from one or more sources 602A-602C of the primary data center 402 and processes the data at 603 to produce historic parameter data sets for input to the input layer 604 of a stacked LSTM model represented at 605 having hidden layers N1-Nm. The term hidden layer as used herein refers to one or a set of multiple layers between the input layer 604 and an output layer 606 of the LSTM model 605 where the historic parameter data set(s) are used as inputs within these hidden layers (N1-Nm) to apply some function to adjust weights and biases at various parameters within these layers. In embodiments, the objective of the LSTM model 605 is to leverage these hidden layer structures iteratively to create or predict a function by reducing error in predicting a value against an actual value.

Figure 7:
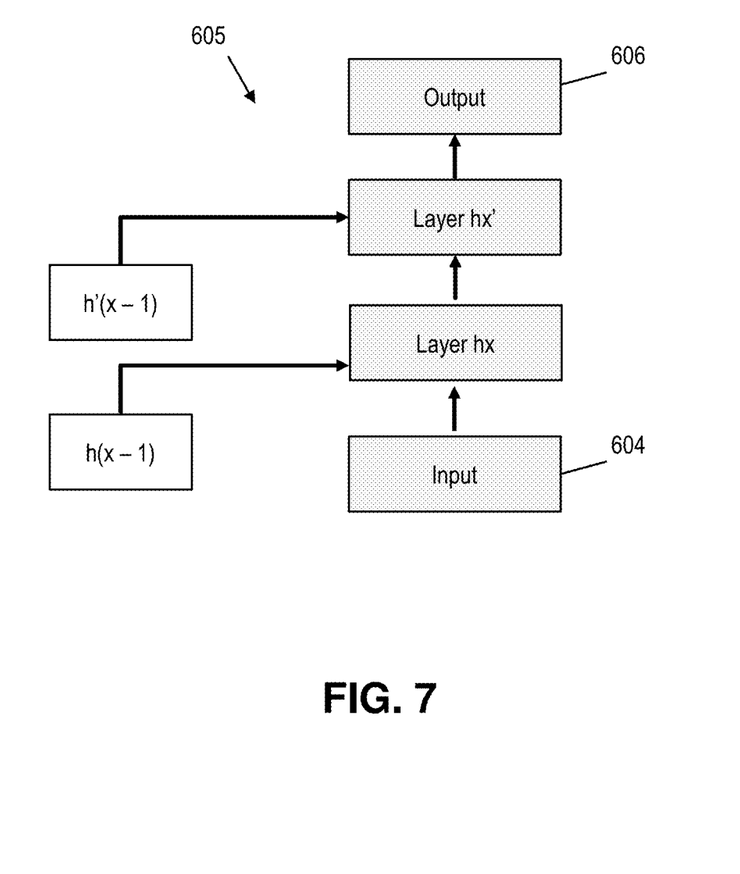
FIG. 7 is a flow diagram of a triggering event model-generating process according to embodiments of the invention.

FIG. 7 is a flow diagram of a triggering event model-generating process according to embodiment of the invention. The triggering event model-generating process of FIG. 7 may be implemented during the process of FIG. 5. As depicted in FIG. 7, hidden layers represented by layer hx' and hx are fed constantly by stacked layers h'(x−1) and h(x−1) subsequently, to pad up to a next layer as a process. In embodiments, stack-wise sequence prediction is computed for every previous time period region and subsequently learned from it to minimize the loss function or error at every Nth region. In implementations, a stacked sequence calculation is performed for a first time period region (e.g., month 1), another stacked sequence calculation is performed for a second time period region (e.g., month 2), etc., for all time period regions. This process improves accuracy of overall failure impact prediction of the present invention.

Figure 8:
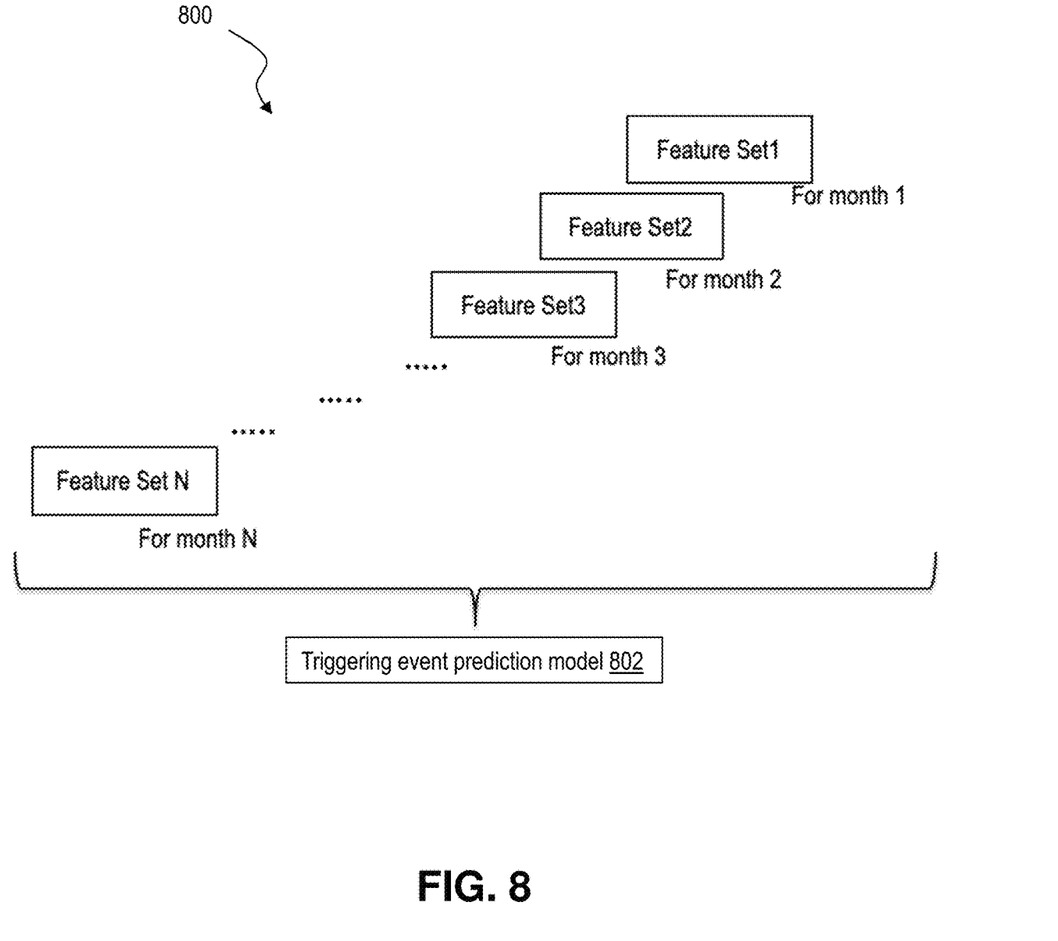
FIG. 8 illustrates a feature engineering process according to embodiments of the invention.

FIG. 8 illustrates a feature engineering process 800 according to embodiments of the invention. In implementations, feature sets of data are stacked according to time periods to generate a triggering event prediction model 802. As depicted in FIG. 8, feature sets 1-N (featured parameter data sets) are stacked based on historical time series data for N months. In the example of FIG. 8, each featured parameter data set is stacked up every month (month wise) and fed into hidden layers of the stacked LSTM process of the present invention as subsequent input to carry out a feature generation process to generate the triggering event prediction model represented at 802. In the example, of FIG. 8, each feature set contains a set of data center parameters (a historic parameter data set). In embodiments, the feature sets include input parameters prepared with historic information and the target parameter data, wherein the target parameter data indicates a probability of a likelihood of failure of one or more resources (e.g., Pod 1, Pod 2) of the primary data center 402. In implementations, the server 410 determines a triggering event based on the predicted likelihood of failure, and issues an alert or notification to switch over the primary data center 402 to the secondary data center 403.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    receiving, by a computing device, input data from a primary data center over a period of time, the input data including sensor data from sensors of the primary data center;
    determining, by the computing device, historic parameter data sets based on the input data, the historic parameter data sets reflecting operating states of one or more resources of the primary data center over the period of time;
    determining, by the computing device, dependencies between the historic parameter data sets using a stacked long short term memory (LSTM) process;
    generating, by the computing device, a triggering event prediction model based on the dependencies between the respective historic parameter data sets and stored target data parameters;
    determining, by the computing device, a triggering event based on an output of the triggering event prediction model and the stored target parameter data, wherein an input to the triggering event prediction model is real-time input data received from the primary data center; and
    initiating, by the computing device, a self-relocating event to automatically relocate data of the primary data center to a secondary data center without human intervention based on the determined triggering event.

2. The method of claim 1, further comprising storing, by the computing device, the target parameter data, wherein the target parameter data includes predetermined threshold values.

3. The method of claim 1, wherein the input data includes time period data indicating the period of time.

4. The method of claim 1, wherein the input data identifies a group of resources within the primary data center.

5. The method of claim 1, wherein the determining the triggering event comprises inputting the real-time data into an input layer of the triggering event prediction model and comparing an output of the triggering event prediction model to the stored target parameter data to determine if the output meets or exceeds a threshold.

6. The method of claim 1, further comprising receiving, by the computing device, input data from the primary data center over a second period of time, the input data including sensor data from sensors of the primary data center;
    determining, by the computing device, additional historic parameter data sets based on the input data over the second period of time, the additional historic parameter data sets reflecting operating states of one or more resources of the primary data center over the second period of time; and
    determining, by the computing device, dependencies between the additional historic parameter data sets using the stacked long short term memory (LSTM) process,
    wherein the generating the triggering event prediction model is based on the dependencies between the respective historic parameter data sets, the dependencies between the respective additional parameter data sets, and the stored target data parameters.

7. The method of claim 1, wherein the stacked LSTM process including hidden layers between an input layer and an output layer, and wherein the historic parameter data sets are used as inputs within the hidden layers to apply functions to adjust weights and biases of various parameters of the historic parameter data sets within the hidden layers.

8. The method of claim 1, wherein the computing device includes software provided as a service in a cloud environment.

9. A computer program product comprising one or more computer readable storage media having program instructions collectively stored on the one or more computer readable storage media, the program instructions executable to:
    store target parameter data including threshold limits for parameters associated with one or more resources of a primary data center;
    receive input data from the primary data center over a period of time, the input data including sensor data from sensors of the primary data center;
    determine historic parameter data sets based on the input data, the historic parameter data sets reflecting operating states of the one or more resources of the primary data center over the period of time;
    determine dependencies between the historic parameter data sets using a stacked long short term memory (LSTM) process;
    generate a triggering event prediction model based on the dependencies between the respective historic parameter data sets and the stored target data parameters;
    determine a triggering event based on an output of the triggering event prediction model and the stored target parameter data, wherein an input to the triggering event prediction model is real-time input data received from the primary data center; and
    initiate a self-relocating event to automatically relocate data of the primary data center to a secondary data center without human intervention based on the determined triggering event.

10. The computer program product of claim 9, wherein the input data includes time period data indicating the period of time.

11. The computer program product of claim 9, wherein the input data identifies a group of resources within the primary data center.

12. The computer program product of claim 9, wherein the determining the triggering event comprises inputting the real-time data into an input layer of the triggering event prediction model and comparing an output of the triggering event prediction model to the stored target parameter data to determine if the output meets or exceeds one of the threshold limits.

13. The computer program product of claim 9, wherein the program instructions are further executable to:
receive input data from the primary data center over a second period of time, the input data including sensor data from sensors of the primary data center;
determine additional historic parameter data sets based on the input data over the second period of time, the additional historic parameter data sets reflecting operating states of one or more resources of the primary data center over the second period of time; and
determine dependencies between the additional historic parameter data sets using the stacked long short term memory (LSTM) process,
wherein the generating the triggering event prediction model is based on the dependencies between the respective historic parameter data sets, the dependencies between the respective additional parameter data sets, and the stored target data parameters.

14. The computer program product of claim 9, wherein the stacked LSTM process including hidden layers between an input layer and an output layer, and wherein the historic parameter data sets are used as inputs within the hidden layers to apply functions to adjust weights and biases of various parameters of the historic parameter data sets within the hidden layers.

15. A system comprising:
a processor, a computer readable memory, one or more computer readable storage media, and program instructions collectively stored on the one or more computer readable storage media, the program instructions executable to:
receive input data from a primary data center over a period of time, the input data including sensor data from sensors of the primary data center;
determine historic parameter data sets based on the input data, the historic parameter data sets reflecting operating states of the one or more resources of the primary data center over the period of time;
determine dependencies between the historic parameter data sets using a stacked long short term memory (LSTM) process;
generate a triggering event prediction model based on the dependencies between the respective historic parameter data sets and stored target data parameters;
receive real-time input data from the primary data center;
determine a triggering event based on an output of the triggering event prediction model and the stored target parameter data, wherein an input to the triggering event prediction model is the real-time input data; and
initiate a self-relocating event to automatically relocate data of the primary data center to a secondary data center without human intervention based on the determined triggering event.

16. The system of claim 15, wherein the input data includes time period data indicating the period of time.

17. The system of claim 15, wherein the input data identifies a group of resources within the primary data center.

18. The system of claim 15, wherein the determining the triggering event comprises inputting the real-time data into an input layer of the triggering event prediction model and comparing an output of the triggering event prediction model to the stored target parameter data to determine if the output meets or exceeds one of the threshold limits.

19. The system of claim 15, wherein the program instructions are further executable to:
receive input data from the primary data center over a second period of time, the input data including sensor data from sensors of the primary data center;
determine additional historic parameter data sets based on the input data over the second period of time, the additional historic parameter data sets reflecting operating states of one or more resources of the primary data center over the second period of time; and
determine dependencies between the additional historic parameter data sets using the stacked long short term memory (LSTM) process,
wherein the generating the triggering event prediction model is based on the dependencies between the respective historic parameter data sets, the dependencies between the respective additional parameter data sets, and the stored target data parameters.

20. The system of claim 15, wherein the stacked LSTM process including hidden layers between an input layer and an output layer, and wherein the historic parameter data sets are used as inputs within the hidden layers to apply functions to adjust weights and biases of various parameters of the historic parameter data sets within the hidden layers.

* * * * *